United States Patent [19]
Cao et al.

[11] Patent Number: 6,148,122
[45] Date of Patent: Nov. 14, 2000

[54] HIGH SPEED LITHIUM NIOBATE POLARIZATION INDEPENDENT MODULATORS

[75] Inventors: Xiang-Dong Cao, Boynton Beach; David Kirk Lewis, Delray Beach, both of Fla.

[73] Assignee: Qtera Corporation, Boca Raton, Fla.

[21] Appl. No.: 09/193,752

[22] Filed: Nov. 17, 1998

[51] Int. Cl.$^7$ .................................................. G02F 1/01
[52] U.S. Cl. ..................... 385/1; 385/2; 385/3; 385/129; 385/130
[58] Field of Search ................................. 385/1, 2, 3, 8, 385/9, 11, 129, 130, 131

[56] References Cited

U.S. PATENT DOCUMENTS

| | | | |
|---|---|---|---|
| 4,262,993 | 4/1981 | Burns et al. | 385/14 X |
| 5,109,441 | 4/1992 | Glaab | 385/3 |
| 5,359,680 | 10/1994 | Riviere | 385/9 |
| 5,442,719 | 8/1995 | Chang et al. | 385/3 |
| 5,703,708 | 12/1997 | Das et al. | 385/1 |
| 5,751,867 | 5/1998 | Schaffner et al. | 385/3 |
| 6,005,992 | 12/1999 | Augustsson et al. | 385/16 |

FOREIGN PATENT DOCUMENTS

| | | | |
|---|---|---|---|
| 0099282 | 1/1984 | European Pat. Off. | 385/1 X |
| 0752607 | 1/1997 | European Pat. Off. | 385/1 X |
| 0816896 | 6/1997 | European Pat. Off. | 385/1 X |

OTHER PUBLICATIONS

Article entitled "10 Gbit/s Single–pass Soliton Transmission Over 1000 km" by M. Nakazawa, *Electronic Letters*, vol. 27, No. 14, pp. 1289–1291, Jul. 4, 1991.

Article entitled "Experimental Demonstration of Soliton Data Transmission Over Unlimited Distances" by M. Nakazawa, *Electronic Letters*, vol. 29, No. 9, pp. 729–730, Apr. 29, 1993.

Article entitled "Soliton Transmission Control In Time And Frequency Domains" by M. Nakazawa, *IEEE Journal of Quantum Electronics*, vol. 29, No. 7, pp. 2189–2197, Jul., 1993.

Article entitled "20 GBit/s Optically Regenerated Transmission over 40 Mm Based On Polarization–independent, Push– pull InP Mach–Zehnder Modulator" by P. Brindel et al., *ECOC '98*, p. 685, (1998).

"Polarisation –Independent Li NbO$_3$....." T. Ishikawa Elect. Lett. GB, IEEE Mar., 1992 Stevenage, vol. 28, No. 6, pp. 566–567.

*Primary Examiner*—Brian Healy
*Attorney, Agent, or Firm*—Irwin Ostroff; Erwin Pfeifle

[57] ABSTRACT

An optical modulator receives both an optical channel signal and at least one electrical driving voltage signal, and generates an optical output channel signal which is polarization independent. The optical modulator includes at least three electrodes, and first and second lithium niobate optical waveguides interspersed between the electrodes. At least one electrode receives the driving voltage signal to provide a travelling wave therealong. The first optical waveguide receives the optical channel signal, and the second optical waveguide provides the optical output channel signal. A cross splice/delay line interconnects the second end of the first optical waveguide to the first end of the second optical waveguide with polarization maintaining optical fibers, respectively, for introducing a predetermined rotation of TE and TM modes. As a result, polarization components at the second end of the second optical waveguide experience a same amount of phase modulation. In one embodiment, the modulator includes three electrodes which are placed in alternating form with the first and second optical waveguides. In a second embodiment, the modulator includes five electrodes, and the first and second optical waveguides are divided into two parallel branches which are positioned between a separate pair of the five electrodes.

12 Claims, 4 Drawing Sheets

HIGH SPEED LITHIUM NIOBATE POLARIZATION INDEPENDENT MODULATORS

CROSS REFERENCE TO RELATED APPLICATIONS

This invention is related to the following application which is assigned to the assignee of the present invention, has a common inventor, and is being filed concurrently: U.S. patent application Ser. No. 09/193,753 (Qtera 1), pending, entitled "Polarization Independent All-Optical Regenerators".

FIELD OF THE INVENTION

The present invention relates to polarization independent modulators using lithium niobate waveguides for use all-optical regenerators in, for example, high-speed, long haul, transmissions, and especially in high-speed soliton transmissions.

BACKGROUND OF THE INVENTION

Electro-optic modulators have become one of the key components for high-speed optical transmission systems. The widely used electro-optic modulators are generally made from lithium niobate ($LiNbO_3$) because of its high electro-optic coefficient and high-quality crystals. Still further, it is also possible to make integrated-optic modulators using lithium niobate crystals. However, lithium niobate modulators are intrinsically polarization dependent which greatly limits their applications. For example, it has been found that inline bit-synchronized phase modulation is very effective in improving system performance. However, the state of polarization in the middle of a transmission line changes over time, which makes it difficult to use lithium niobate modulators unless some automatic polarization tracking technique is used. Thus far, lithium niobate modulators are only used at a transmitter site when the laser source is still linearly polarized. The polarization dependence comes from the asymmetric electro-optic response of lithium niobate crystals. For 10 Gbit/sec and 40 Gbit/sec systems, it is desirable to use phase modulators either in the middle of the transmission line or in front of a receiver. However, lithium niobate modulators have not been able to be used due to their polarization dependency without an automatic polarization tracking technique being used, which increases the cost.

All-optical regenerators are expected to be a key element in future high-capacity photonic networks since such regenerators provide many advantages compared to their electronic counterparts. The advantages provided by the all-optical regenerators are, for example, bit rate independence, higher speeds, and lower cost. Several types of all-optical regenerators have been proposed in recent years such as, for example, semiconductor optical amplifier (SOA) based regenerators, nonlinear optical loop mirror (NOLM) based regenerators, and synchronous modulation based regenerators.

Essentially unlimited propagation distance at high bit rate (>10 Gbit/sec) has been demonstrated using the technique of synchronous modulation. In this regard, see, for example, the articles by M. Nakazawa et al. in (a) Electronic Letters, Vol. 27, No. 14, pages 1289–1291, Jul. 4, 1991, entitled "10 Gbit/s Single-Pass Soliton Transmission Over 1000 km" (b) IEEE Journal of Quantum Electronics, Vol. 29, No. 7, pages 2189–2197, July, 1993, entitled "Soliton Transmission Control In Time And Frequency Domains" and (c) Electronic Letters, Vol. 29, No. 9, pages 729–730, Apr. 29, 1993, entitled "Experimental Demonstration Of Soliton Data Transmission Over Unlimited Distances". The disadvantage of the synchronous modulators used is that polarization dependence is an very detrimental limitation for practical applications, other than possibly integrated high-speed transmitters, since endless polarization tracking would be required.

The article by P. Brindel et al. entitled "20 Gbit/s Optically Regenerated Transmission over 40 Mm Based on Polarization-independent, Push-pull InP Mach-Zehnder Modulator", in ECOC '98, pages 685 and 686, September, 1998, discloses a newer type of modulator without polarization dependence. The modulator is a Mach-Zehnder modulator made from InP. However, this type of modulator has a high insertion loss (>20 dB) which makes it difficult to use in practical applications.

It is desirable to provide polarization independent lithium niobate modulators for use in, for example, an all-optical regenerator which and advantageously has low insertion loss (e.g., <8 dB), a low driving voltage, and can be widely used in high-speed transmissions.

SUMMARY OF THE INVENTION

The present invention is directed to polarization independent lithium niobate modulators which can be used in, for example, synchronous polarization independent all-optical regenerators.

Viewed from one aspect, the present invention is directed to an optical modulator comprising at least three electrodes, first and a second lithium niobate optical waveguides, and cross splice/delay line means. At least one of the electrodes is coupled to receive a driving voltage signal for generating a traveling wave therein. The first and a second lithium niobate optical waveguides are interspersed between the at least three electrodes. The first lithium niobate waveguide is coupled to receive the optical channel signal from a remote source at a first end thereof. The second lithium niobate waveguide is coupled at a second end thereof to provide an optical output signal from the modulator which is polarization independent. The cross splice/delay line means interconnects a second end of the first lithium niobate optical waveguide to a first end of the second lithium niobate optical waveguide for introducing a predetermined rotation of TE and TM modes in the optical channel signal. This results in polarization components at a second end of the second lithium niobate optical waveguide experiencing a same amount of phase modulation.

Viewed from another aspect, the present invention is directed to an optical modulator comprising a substrate, first, second, and third electrically conductive electrodes, first and second lithium niobate optical waveguides, and cross splice/delay line means. The first, second, and third electrically conductive electrodes are formed substantially parallel to each other on the substrate. The first and third electrodes are coupled to a predetermined fixed potential, and the second electrode is coupled to receive an electrical driving voltage signal to form a travelling wave therealong. The first and second lithium niobate optical waveguides are formed on the substrate and oriented substantially parallel to each other with the first lithium niobate optical waveguide being located between the first and second electrodes and coupled at a first end thereof to receive an optical channel signal from a remote source. The second lithium niobate optical waveguide is located between the second and third electrodes and is coupled at a second end thereof for use in forming an output signal from the modulator. The cross splice/delay line means interconnects a second end of the first lithium niobate optical waveguide to a first end of the second lithium niobate optical waveguide for introducing a predetermined rotation of TE and TM modes in the optical channel signal. This results in polarization components at a second end of the second lithium niobate optical waveguide experiencing a same amount of phase modulation.

Viewed from still another aspect the present invention is directed to an optical modulator comprising a substrate, first, second, third, fourth, and fifth electrically conductive electrodes, first and second lithium niobate optical waveguides, and cross splice/delay line means. The first, second, third, fourth, and fifth electrically conductive electrodes are formed substantially parallel to each other on the substrate. The second and fourth electrodes are coupled to a predetermined fixed potential, the first and fifth electrodes are coupled to receive a first electrical driving voltage signal to form a travelling wave therealong, and the third electrode are coupled to receive a second electrical driving voltage signal to form a travelling wave therealong. The first and second lithium niobate optical waveguides are formed on the substrate and oriented substantially parallel to each other. The first lithium niobate optical waveguide is coupled at a first end thereof to receive an optical channel signal from a remote source and is then divided into first and second optical paths which extend between the first and second electrodes and the second and third electrodes, respectively, before being coupled together at a second end thereof. The second lithium niobate optical waveguide is divided at a first end thereof into first and second optical paths which extend between the third and fourth electrodes and the fourth and fifth electrodes, respectively, before being coupled together at a second end thereof to form an output channel signal from the modulator. The cross splice/delay line means interconnects a second end of the first lithium niobate optical waveguide to a first end of the second lithium niobate optical waveguide for introducing a predetermined rotation of TE and TM modes in the optical channel signal. This results in polarization components at a second end of the second lithium niobate optical waveguide experiencing a same amount of phase modulation.

The invention will be better understood from the following more detailed description taken with the accompanying drawings and claims.

DETAILED DESCRIPTION

Figure 1:
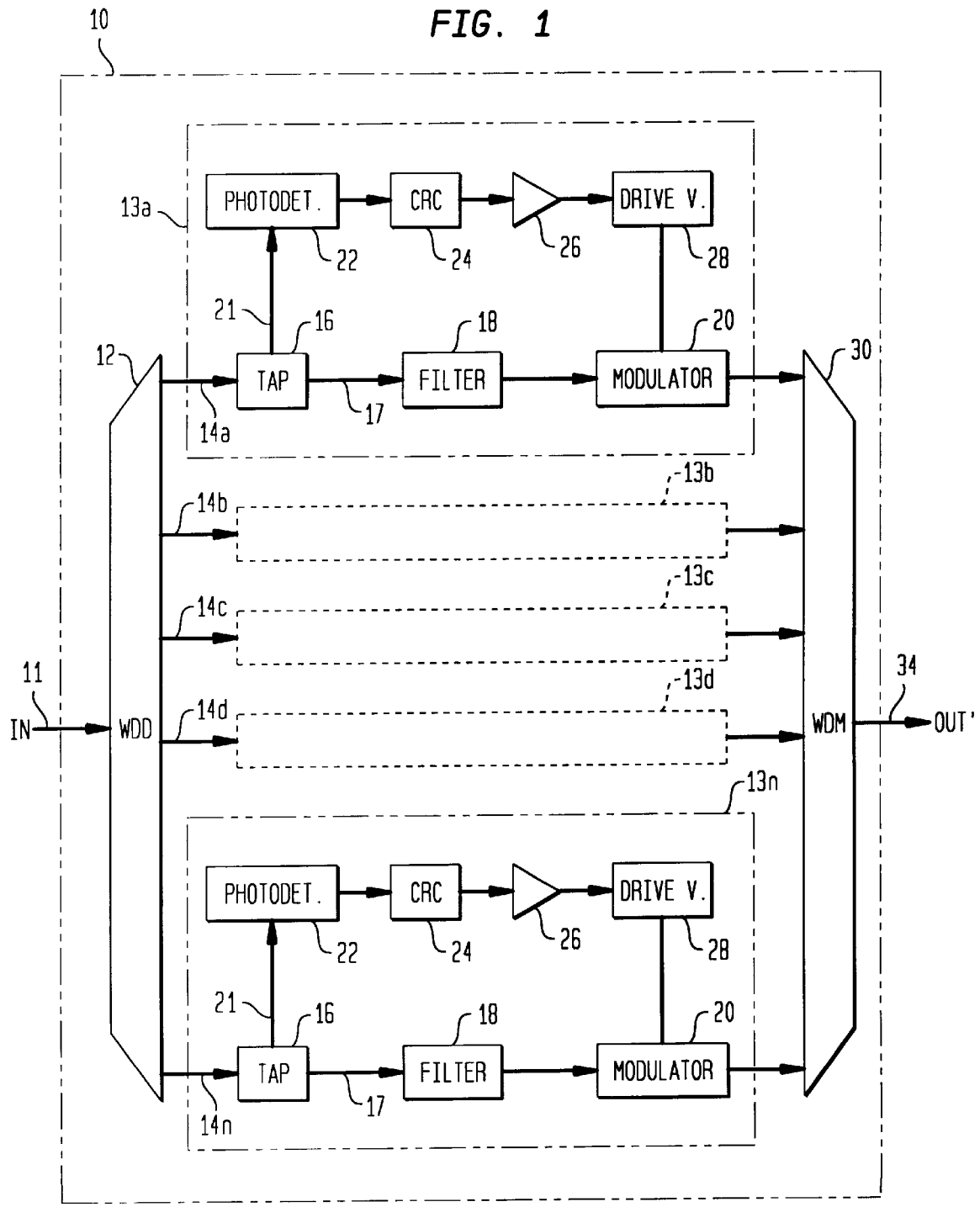
FIG. 1 shows a block diagram of a synchronous all-optic regenerator in accordance with the present invention.

Referring now to FIG. 1, there is shown a block diagram of a synchronous all-optic regenerator 10 (shown within a dashed line rectangle) in accordance with the present invention. The regenerator 10 comprises an optical wavelength division demultiplexer (WDD) 12, a plurality of N optical signal regeneration arrangements 13a–13n (shown within dashed line rectangles) of which only the regeneration arrangements 13a and 13n have their elements shown in block diagram form, and an optical wavelength division multiplexer (WDM) 30. Each of the optical signal regeneration arrangements 13a–13n comprises an optical power tap 16, an optical filter 18, an electro-optic modulator 20, a high-speed photodetector (PHOTODET.) 22, a clock recovery circuit (CRC.) 24, an amplifier 26, and a Driving Voltage (DRIVE V.) circuit 28.

In each of the regeneration arrangements 13a–13n a separate optical path (e.g., 14a, 14b, 14c, 14d, . . . , or 14n) from the WDD 12 is coupled to an input of the associated optical tap 16. The optical tap 16 has first and second optical outputs that are coupled to first and second optical fibers 17 and 21, respectively. The first optical fiber 17 from the optical tap 16 is coupled through the optical filter 18 to a first input of the electro-optic modulator 20. The second optical fiber 21 from the optical tap 16 is coupled to an input of the photodetector 22. The output of the photodetector 22 is coupled to an input of the clock recovery circuit 24, and an output of the clock recovery circuit 24 is coupled to an input of the amplifier 26. An output of the amplifier 26 is coupled to an input of the Driving Voltage circuit 28, and an output of the Driving Voltage circuit 28 is coupled to a second input of the modulator 20. An output of the modulator 20 is coupled to a separate one of N optical inputs to the WDM 30. The combination of the electro-optic modulator 20 and the clock recovery circuit 24 forms the modulator 20 into a synchronous modulator because the modulator is synchronized with the recovered clock signal.

In the operation of the regenerator 10, an optical input signal comprising N wavelength division multiplexed channels is provided via a single mode optical fiber 11 as the input to the WDD 12, where N can comprise any integer $\geq 2$. The WDD 20 is a wavelength division demultiplexer which directs the N wavelength division multiplexed channels along the N separate output optical paths 14a–14n. A first channel of the received wavelength division multiplexed optical signal is directed along optical path 14a to an input of the optical tap 16 of the first regeneration arrangement 13a. Similarly, the second, third, fourth, and Nth channel of the received wavelength division multiplexed optical signal are directed along optical paths 14b, 14c, 14d, and 14n, respectively, to an input of the associated optical tap 16 of the respective second, third, fourth, and Nth regeneration arrangements 13b, 13c, 13d, and 13n. The following description is directed to the operation of the regeneration arrangement 13a only. Each of the remaining regeneration arrangements 13b–13n operates in a corresponding manner on the associated channel signal of the received wavelength division multiplexed optical channel signal which are directed onto paths 14b–14n, respectively.

In the regeneration arrangement 13a, a first output of the optical tap 16 directs a predetermined portion of the received input optical channel signal along optical fiber 17 to an input of the optical filter 18 which provides a passband for only the channel signal being processed by the regeneration arrangement 13a. For example, in regeneration arrangement 13a, the filter 18 is arranged to pass the optical signal of the first channel signal of the N wavelength division multiplexed channels directed by the WDD 12 onto path 14a, and to reject optical signals of any noise and all of the other N–1 channel signals. The optical output signal from filter 18 is provided as a first input to the modulator 20.

A second output of the optical tap 16 directs a remaining portion of the input optical channel signal on path 14a along optical fiber 21 to an input of the high-speed photodetector 22. The photodetector 22 converts the optical input signal from the tap 16 into a corresponding electrical channel signal which is coupled to an input of the clock recovery circuit 24. The clock recovery circuit 24 is responsive to the electrical channel signal from the photodetector 22 for generating an electrical clock signal having a frequency corresponding to the bit rate frequency of the optical channel signal directed by the WDD 12 onto path 14a. The clock recovery circuit 24 also functions to adjust the phase of the clock signal so that the clock signal received at the modulator 20 is in phase with the optical channel signal received by the modulator 20 from the optical filter 18. This is essentially a one-time phase adjustment to compensate for any delays introduced by one or more of the amplifier 26, drive voltage circuit 28, filter 18, and a difference between the length of the paths 17 and 21 from the optical tap 16 to the modulator 20.

The generated clock signal from the clock recovery circuit 24 is amplified in amplifier 24 to a predetermined amplitude and coupled to an input of the drive voltage circuit 28. The drive voltage circuit 28 is responsive to the amplified clock signal for generating one or more driving voltage signals that drive the modulator 20 in accordance with the present invention. The modulator 20 modulates the amplitude and/or phase of the optical channel pulse stream received from the filter 18 and generates a regenerated optical output signal which is coupled to a separate input of the WDM 30. In the WDM 30, the plurality of N regenerated optical channel signals propagating along paths 14a–14n from the associated modulators 20 in the regeneration arrangements 13a–13n are multiplexed and transmitted as an N wavelength division multiplexed optical output signal over optical fiber 34. The N wavelength division multiplexed optical output signal on optical fiber 34 is generally provided as an input to an optical amplifier (not shown). The optical amplifier is normally an Erbium-doped fiber amplifier (EDFA) which amplifies the N multiplexed optical channel signals to a predetermined amplitude level before being transmitted to a remote location.

Figure 2:
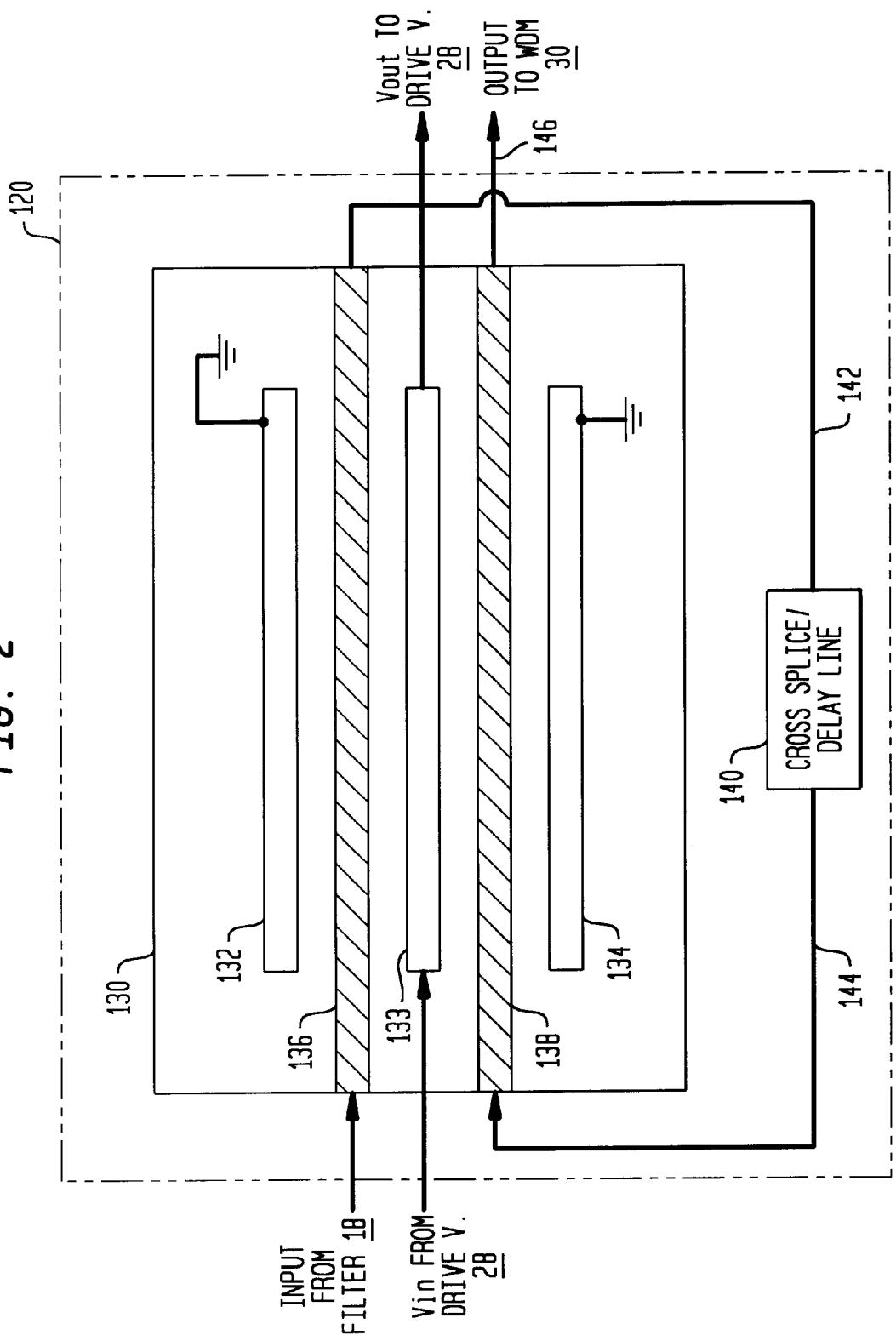
FIG. 2 shows a schematic layout of an exemplary polarization independent phase modulator for use in the regenerator of FIG. 1 in accordance with a first embodiment of the present invention.

Referring now to FIG. 2, there is shown a schematic layout of an exemplary polarization independent phase modulator 120 which can be used as the modulator 20 in the polarization-independent all-optical regenerator 10 of FIG. 1 in accordance with a first embodiment of the present invention. The polarization independent phase modulator 120 comprises a cross splice/delay line device 140, and a lithium niobate substrate 130 comprising a first electrically conductive electrode 132, a second electrically conductive electrode 133, a third electrically conductive electrode 134, a first Lithium Niobate waveguide 136 (shown as a hatched rectangle), and a second Lithium Niobate waveguide 138 (shown as a hatched rectangle). The first Lithium Niobate waveguide 136 is located between, and parallel to, the first and second electrodes 132 and 133, while the second Lithium Niobate waveguide 138 is located between, and parallel to, the second and third electrodes 133 and 134. The first and third electrodes 132 and 134 are coupled to a reference potential which illustratively is ground potential. The second electrode 133 is electrically coupled at a first end thereof to receive an input voltage (Vin) from the drive voltage circuit 28 shown in FIG. 1, and is coupled at a second opposing end thereof back to the drive voltage circuit 28 by any method to complete the circuit. The first Lithium Niobate waveguide 136 is coupled at a first end thereof to receive the optical channel signal from the filter 18 of FIG. 1, and is coupled at a second opposing end thereof to an input of the cross splice/delay line device 140 via a polarization maintaining optical fiber 142. An output of the cross splice/delay line device 140 is coupled to a first end of the second Lithium Niobate waveguide 138 via a polarization maintaining optical fiber 144. A second opposing end of the second Lithium Niobate waveguide 138 is coupled via an optical fiber 146 to a predetermined optical input of the WDM 30.

The first and second Lithium Niobate waveguides 136 and 138 are formed on the lithium niobate substrate 130 and can be either x-cut or z-cut depending on the intended applications. The positions of the electrodes 132, 133, and 134 will be different for the x-cut and the z-cut optical waveguides 136 and 138. The arrangement of the electrodes 132, 133, and 134 in the modulator 120 are shown for x-cut optical waveguides 136 and 138, where the optical waveguides 136 and 138 are located between the electrodes 132, 133, and 134. For z-cut optical waveguides 136 and 138, the second (middle) electrode 133 will be sufficiently wide to extend on top of both of the optical waveguides 136 and 138.

In operation, the input of the first optical waveguide 136 is coupled to a single mode optical fiber from the optical filter 18 of FIG. 1 so that both TE and TM modes can be coupled into the first optical waveguide 136 without introducing mode coupling. The first and third electrodes 132 and 134 are placed at ground potential, while the second electrode 133 has a travelling wave running from left to right caused by the driving voltage (Vin) from the drive voltage circuit 28 of FIG. 1. The driving voltage (Vin) is essentially a pulse stream of the recovered clock signal from the clock recovery circuit 24 of FIG. 1, which has been appropriately phase adjusted by the clock recovery circuit 24. The travelling wave produced by the driving voltage (Vin) in the second electrode 133 co-propagates with the optical signal in the first and second optical waveguides 136 and 138 and modifies the phase of the optical field due to an electro-optic response of Lithium Niobate crystals. More particularly, the travelling wave produced in the second electrode 133 provides an electric field that induces some optical change in the optical waveguides 136 and 138 to cause a predetermined phase adjustment in the optical signal. In general, the input optical field to the first and second optical waveguides 136 and 138 consists to two orthogonal polarizations (TE and TM modes). Although both components of the two orthogonal polarizations experience phase modulation generated by the travelling electric wave in the second electrode 133, the modulation depths of the TE and TM modes are very different due to the asymmetric electro-optic responses of the Lithium Niobate crystals.

In order to compensate for the polarization dependence, a first and second polarization maintaining optical fibers 142 and 144 are used to route the output of the first optical waveguide 136 to the input of the second optical waveguide 138 via the cross splice/delay line device 140. In the cross splice/delay line device 140, the first and second polarization maintaining optical fibers 142 and 144 are coupled together with the axes rotated 90 degrees with respect to each other. As a result, the TE and TM modes are rotated 90 degrees at the input of the second optical waveguide 138. After passing through the second optical waveguide 138, which is driven by the same travelling electric wave occurring in the second electrode 133, the two polarization components (TE and TM modes) experience the same amount of phase modulation. The output of the second optical waveguide 138 is coupled to a signal mode optical fiber 146 which is coupled to the predetermined input of the WDM 30 of FIG. 1.

When the modulation speed in the modulator 120 is smaller than the transverse time of the optical signal, the first and second polarization maintaining optical fibers 142 and 144 can be simply spliced together. Otherwise, a tunable delay line should be used to match the phases of the optical field and the driving electric signal (Vin). This is very important for high speed periodic phase modulators. The lengths of the first and second polarization maintaining optical fibers 142 and 144 should be matched as close as possible so that there is no significant group delay between the TE and TM components. A delay line (not shown) in the cross splice/delay line device 140 is adjusted in such a way that the optical field is in phase with the electrical field at the input of the second optical waveguide 138. The delay line in the cross splice/delay line device 140 can be, for example, an all-fiber type such as a fiber stretcher controlled by a well-known piezo drum with the fiber wound on it, or simply mechanical in free space. It is known that Lithium Niobate crystals are highly birefringent, which causes phase distortion as well as group delay. The modulator 120 allows for full compensation for birefringence, since the first and second optical waveguides 136 and 138 are identical and the input optical fields are rotated by 90 degrees.

Figure 3:
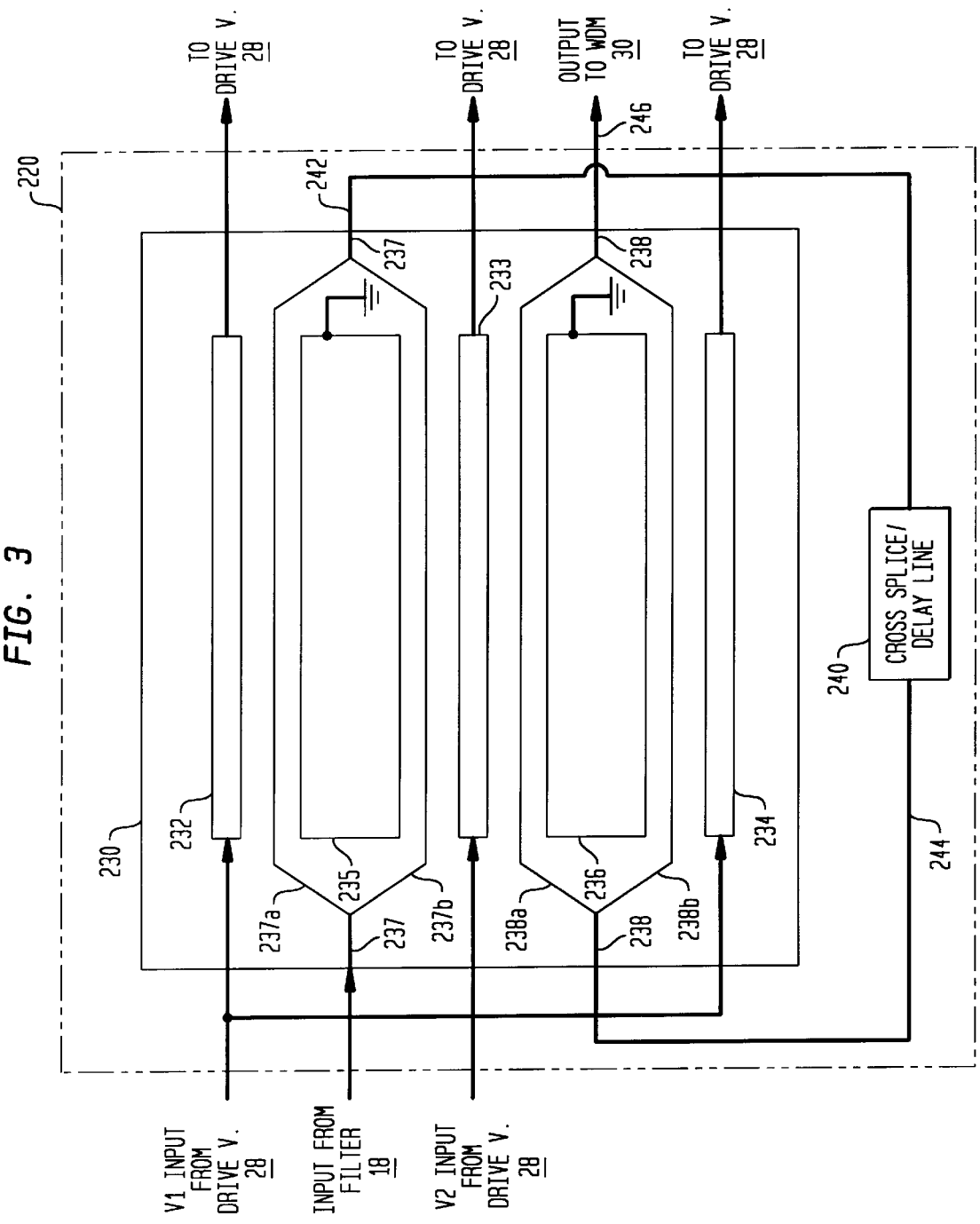
FIG. 3 shows a schematic layout of an exemplary polarization independent amplitude/phase modulator for use in the regenerator of FIG. 1 in accordance with a second embodiment of the present invention.

Referring now to FIG. 3, there is shown a schematic layout of an exemplary polarization independent amplitude/phase modulator 220 which can be used as the modulator 20 in the polarization-independent all-optical regenerator 10 of FIG. 1 in accordance with a second embodiment of the present invention. The polarization independent amplitude/phase modulator 220 comprises a cross splice/delay line device 240, and a lithium niobate substrate 230 comprising a first electrically conductive electrode 232, a second electrically conductive electrode 233, a third electrically conductive electrode 234, a fourth electrically conductive electrode 235, a fifth electrically conductive electrode 236, a first Lithium Niobate waveguide 237 having two parallel branches 237a and 237b, and a second Lithium Niobate waveguide 238 having two parallel branches 238a and 238b. The first Lithium Niobate waveguide 237 is coupled at one end to the output of the optical filter 18 of FIG. 1, and has its first branch 237a located between, and parallel to, the first and fourth electrodes 232 and 235, while the second branch 237b is located between, and parallel to, the second and fourth electrodes 233 and 235. Each of the first and second branches 237a and 237b are combined into a single optical waveguide after passing the end of the adjacent electrodes 232, 233, and 235. The single optical waveguide 237 is then coupled to an input of the cross splice/delay line device 240 via a first polarization maintaining optical fiber 242.

The second Lithium Niobate waveguide 238 is coupled at one end to an output from the cross splice/delay line device 240 via a second polarization maintaining optical fiber 244. The second waveguide 238 has its first branch 238a located between, and parallel to, the second and fifth electrodes 233 and 236, while the second branch 238b thereof is located between, and parallel to, the third and fifth electrodes 234 and 236. Each of the first and second branches 238a and 238b are combined into a single optical waveguide after passing the end of the adjacent electrodes 233, 234, and 236. The single optical waveguide 238 is then coupled via an optical fiber 246 to a predetermined input of the WDM 30 of FIG. 1. The fourth and fifth electrodes 235 and 236 are coupled to ground potential. The first and third electrodes 232 and 234 are electrically coupled at one end thereof to receive a first input voltage (V1) from the drive voltage circuit 28 shown in FIG. 1. The second electrode 233 is electrically coupled at one end thereof to receive a second input voltage (V2) from the drive voltage circuit 28 shown in FIG. 1. The other ends of the first, second, and third electrodes 232, 233, and 234 are coupled to a return lead to the drive voltage circuit to complete the circuit. The operation of the cross splice/delay line device 240 in relation to the polarization maintaining optical input fiber 242 and the polarization maintaining optical output fiber 244 is the same as was described hereinbefore for the cross splice/delay line device 140, and the input and output polarization maintaining optical fibers 142 and 144, in the modulator 120 of FIG. 2. It is to be understood that there may be different arrangements of the electrodes (e.g., 232, 233, 234, 235, and 236) for different requirements, without changing the basic concepts of the present invention.

The electrodes 232, 233, and 235 in relationship to the branches 237a and 237b of the Lithium Niobate waveguide 237, and the electrodes 233, 234, and 236 in relationship to the branches 238a and 238b of the Lithium Niobate waveguide 238, operate in a similar manner to that described hereinbefore for the electrodes 132, 133, and 134, and the optical waveguides 136 and 138 of FIG. 2. More particularly, the V1 input from the drive voltage circuit 28 causes a travelling wave to propagate in the electrodes 232 and 234, which causes both predetermined phase and amplitude changes in optical signal propagating in the optical waveguide branches 237a and 238b due to the electro-optic response of Lithium Niobate crystals therein. Similarly, the V2 input from the drive voltage circuit 28 causes a travelling wave to propagate in the electrode 233, which causes both predetermined phase and amplitude changes in the optical signal propagating in the optical waveguide branches 237b and 238a due to the electro-optic response of Lithium Niobate crystals therein. When the branches 237a and 237b, and the branches 238a and 238b, are combined to form the output from optical waveguides 237 and 238, respectively, the input optical signal from the filter 18 (shown in FIG. 1) is both amplitude and phase modulated and provided as an output to the WDD 30 (shown in FIG. 1).

To use the arrangement of modulator 220 in synchronous all-optical regeneration, it is better to use a push-pull configuration. Since it is possible to perform amplitude and phase modulation simultaneously, there is no need to cascade a separate phase modulator after an amplitude modulator. To achieve the push-pull configuration, the input voltages V1 and V2 should be values given by the expression:

$$V1,2 = V0(t) \pm V(t),$$

where t is time, and both V0 and V have the same waveform as the clock signal from the clock recovery circuit 24 of FIG. 1. The voltage V0 is responsible for phase modulation, while the voltage V is the push-pull amplitude, which is responsible for amplitude modulation. The phase difference between V0 and V can be zero or 180 degrees depending on the desired sign of "chirp". "Chirp" indicates that the frequency across a pulse is not uniform because of frequency changes over time across the pulse. For example, when a pulse is launched through a chromatic dispersant element such as an optical fiber, the pulse becomes chirped because the lower frequency portion moves faster when compared to the higher frequency portion. Therefore, the leading edge of the pulse has a lower frequency than the trailing edge of the pulse, which is referred to as a "chirp".

Figure 4:
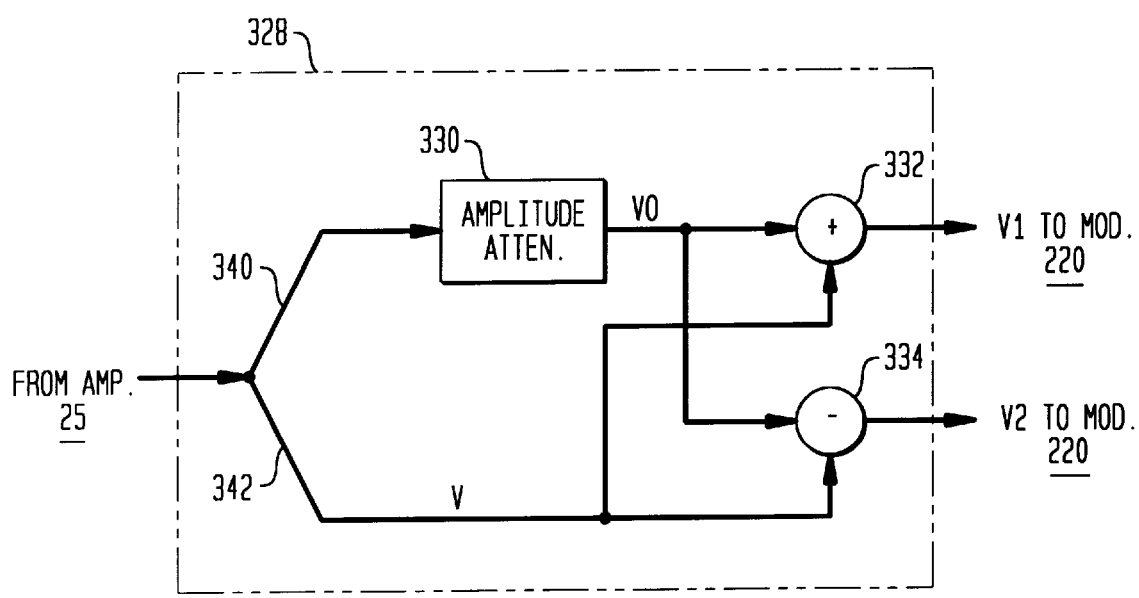
FIG. 4 shows a schematic of drive voltage circuitry to achieve push-pull modulation in the regenerator of FIG. 1 using the amplitude/phase modulator of FIG. 3 in accordance with the present invention.

Referring now to FIG. 4, there is shown a schematic of a drive voltage circuit 328 (shown within a dashed line rectangle) which can be used as the drive voltage circuit 28 in the regenerator 10 of FIG. 1 to achieve push-pull modulation when using the amplitude/phase modulator 220 of FIG. 3 in accordance with the present invention. The drive voltage circuit 328 comprises an amplitude attenuator (AMPLITUDE ATTEN.) 330, an adder circuit (+) 332, and a subtraction circuit (−) 334. In the driving voltage circuit 328, an amplified electrical clock signal is received from the amplifier 26 (shown in FIG. 1) and is split into first and second electrical paths 340 and 342. The portion of the clock signal in first path 340 has its amplitude attenuated by the amplitude attenuator 330 to generate an output signal voltage V0, while the portion of the clock signal in the second path 342 has a signal voltage V. The signal voltage V0 is provided as a first input to each of the adder circuit 332 and the subtraction circuit 334, while the signal voltage V is provided as a second input to each of the adder circuit 332 and the subtraction circuit 334. The adder circuit 332 adds the V and V0 signals to generate a V1 output signal which is coupled to the modulator 220 of FIG. 3, while the subtraction circuit subtracts V and V0 to generate the V2 output signal which is coupled to the modulator 220 of FIG. 3. Each of the V1 and V2 signals are generated by the adder circuit 332 and subtraction circuit 334, respectively, include a predetermined phase delay necessary for the push-pull operation of the modulator 220 of FIG. 3.

In the driving voltage circuit 328 of FIG. 4, the recovered clock signal is split into the two branches 340 and 342. The amplitude attenuator 330 in the branch 340 generates an output signal V0 which an attenuated version of the recovered clock signal and is ultimately responsible for phase modulation in the modulator 220 of FIG. 3. The signal V propagating in the branch 342 corresponds to the recovered clock signal and is ultimately responsible for the push-pull amplitude modulation in the modulator 220 of FIG. 3. The adder circuit 332 receives both of the clock signals V and V0, and adds the two received signals to generate the output signal V1=V0+V which is provided to the modulator 220 of FIG. 3. The subtraction circuit 334 subtracts the signal V on branch 342 from the V0 signal at the output of 20 the amplitude attenuator 330 to generate the signal V2=V0−V which is provided to the modulator 220 of FIG. 3. It is to be understood that the signals V, V0, V1, and V2 all have the same waveform and are in phase, but have different amplitudes due to the operations of the amplitude attenuator 330, the adder circuit 332, and the subtraction circuit 334.

For an understanding of the responsibilities indicated for the V0 and V signals, if, for example, only the signal V0 from the amplitude attenuator 330 were provided as inputs to the adder circuit 332 and the subtraction circuit 334, then the output of the adder circuit 332 and the subtraction circuit 334 would be the exact same signal (+V0) and provided as the signals V1 and V2. This same signal would be applied to the first, second, and third electrodes 232, 233, and 234 of the modulator 220 of FIG. 3 and only cause a phase modulation to occur in the waveguide branches 237a, 237b, 238a, and 238b. However, if, for example, only the signal V in the branch 342 were provided as an input to the adder circuit 332 and the subtraction circuit 334, then the output signal V1 from the adder circuit 332 would correspond to a positive V signal (+V), while the output signal V2 from the subtraction circuit 334 would correspond to a negative V signal (−V). Under this condition, the signals +V and −V are out of phase and form portions of the signals V1 and V2, respectively, when combined with V0 in the respective adder circuit 332 and the subtraction circuit 334. Therefore, when the V1 signal (+V portion) is applied to the electrodes 232 and 234 of the modulator 220 of FIG. 3, and the V2 signal (−V portion) is applied to the electrode 233 of the modulator 220 of FIG. 3, the two signals (+V and −V) cause a push-pull amplitude modulation in the lithium niobate waveguide branches 237a and 237b, and in the lithium niobate waveguide branches 238a and 238b. More particularly, in the lithium niobate optical waveguide 237 shown in FIG. 3, the first branch 237a is affected by V1 being applied to the first electrode 232 which includes the +V portion therein, while the second branch 237b is affected by V2 being applied to the second electrode 233 which includes the −V portion therein. Both V1 and V2 have a common voltage V0 which is responsible for causing a predetermined phase modulation in the optical channel signal received from the filter 18 of FIG. 1 when passing through waveguides 237 and 238. However, the difference between V1 and V2 is the inclusion of +V and −V, respectively, which drive the modulator 220 as a push-pull device, where branch 237a is pushed by the +V portion of V1, and branch 237b is pulled by the −V portion of V1.

The polarization independent modulator is a key component of the synchronous all-optical regenerator 10 of FIG. 1, since the modulators 120 and 220 of FIGS. 2 and 3, respectively, provide polarization independence, high speed, low insertion loss, low driving voltages, good reliability, and ease of manufacture. The modulators 120 and 220 perform re-shaping of the input signal pulse, where the periodic amplitude modulation reshapes the optical pulses since pulse distortion outside the clock pulses will be chopped off. The modulators 120 and 220 also perform re-timing, where timing-jitter is corrected by the periodic amplitude modulation. Still further, the synchronous amplitude modulation helps to improve signal-to-noise ratio, since the noise located in between clock pulses will be substantially eliminated. Phase modulation generates frequency chirp, which can be used to control timing jitter as well as pulse distortion.

It is to be appreciated and understood that the specific embodiments of the present invention described hereinbefore are merely illustrative of the general principles of the invention. Various modifications may be made by those skilled in the art which are consistent with the principles set forth.

What is claimed is:

1. An optical modulator comprising:
    at least three electrodes wherein at least one of the electrodes is coupled to receive a driving voltage signal for generating a traveling wave therein;
    first and a second lithium niobate optical waveguides interspersed between the at least three electrodes, the first lithium niobate waveguide being coupled to receive the optical channel signal from a remote source at a first end thereof, and the second lithium niobate waveguide is coupled at a second end thereof to provide an optical output signal from the modulator which is polarization independent; and
    cross splice/delay line means for interconnecting a second end of the first lithium niobate optical waveguide to a first end of the second lithium niobate optical waveguide for introducing a predetermined rotation of TE and TM modes in the optical channel signal so that polarization components at a second end of the second lithium niobate optical waveguide experience a same amount of phase modulation.

2. The optical modulator of claim 1 wherein the cross splice/delay line means is coupled to the second end of the first lithium niobate optical waveguide and to the first end of the second lithium niobate optical waveguide with first and second polarization maintaining optical fibers, respectively.

3. The optical modulator of claim 1 wherein the modulator comprises:

a substrate;

the at least three electrodes comprise first, second, and third electrically conductive electrodes formed substantially parallel to each other on the substrate, the first and third electrodes being coupled to a predetermined fixed potential, and the second electrode is coupled to receive an electrical driving voltage signal from the clock recovery means to form a travelling wave therealong; and the first and second lithium niobate optical waveguides are formed on the substrate and oriented substantially parallel to each other, the first lithium niobate optical waveguide being located between the first and second electrodes and coupled at a first end thereof to receive the associated optical channel signal, and the second lithium niobate optical waveguide is located between the second and third electrodes and coupled at a second end thereof for use in forming an output signal from the modulator.

4. The optical modulator of claim 3 wherein the cross splice/delay line means is coupled to the second end of the first lithium niobate optical waveguide and to the first end of the second lithium niobate optical waveguide with first and second polarization maintaining optical fibers, respectively.

5. The optical modulator of claim 1 wherein the modulator comprises:

a substrate; and the at least three electrodes comprise first, second, third, fourth, and fifth electrically conductive electrodes formed substantially parallel to each other on the substrate, the second and fourth electrodes being coupled to a predetermined fixed potential, the first and fifth electrodes being coupled to receive a first electrical driving voltage signal from the clock recovery means to form a travelling wave therealong, and the third electrode being coupled to receive a second electrical driving voltage signal from the clock recovery means to form a travelling wave therealong; and the first and second lithium niobate optical waveguides formed on the substrate and oriented substantially parallel to each other, the first lithium niobate optical waveguide being coupled at a first end thereof to receive the associated optical channel signal and is then divided into first and second optical paths which extend between the first and second electrodes and the second and third electrodes, respectively, before being coupled together at a second end thereof, and the second lithium niobate optical waveguide is divided at a first end thereof into first and second optical paths which extend between the third and fourth electrodes and the fourth and fifth electrodes, respectively, before being coupled together at a second end thereof to form an output channel signal from the modulator.

6. The optical modulator of claim 5 wherein the cross splice/delay line means is coupled to the second end of the first lithium niobate optical waveguide and to the first end of the second lithium niobate optical waveguide with first and second polarization maintaining optical fibers, respectively.

7. The optical modulator of claim 1 further comprising:

a driving voltage means comprising:

an amplitude attenuation means for attenuating the amplitude of a recovered clock signal by a predetermined amount and generating an output signal that is responsible for phase modulation in the modulator;

an adder for adding the output signal from the amplitude attenuation means, and the received recovered clock signal which is responsible for a push-pull amplitude in the modulator, for generating the first electrical driving voltage signal used by the modulator; and a subtraction means for subtracting the output signal from the amplitude attenuation means and the received recovered clock signal for generating the second electrical driving voltage signal used by the modulator.

8. An optical modulator comprising:

a substrate;

first, second, and third electrically conductive electrodes formed substantially parallel to each other on the substrate, the first and third electrodes being coupled to a predetermined fixed potential, and the second electrode is coupled to receive an electrical driving voltage signal to form a travelling wave therealong;

first and second lithium niobate optical waveguides formed on the substrate and oriented substantially parallel to each other, the first lithium niobate optical waveguide being located between the first and second electrodes and coupled at a first end thereof to receive an optical channel signal from a remote source, and the second lithium niobate optical waveguide is located between the second and third electrodes and coupled at a second end thereof for use in forming an output signal from the modulator; and cross splice/delay line means for interconnecting a second end of the first lithium niobate optical waveguide to a first end of the second lithium niobate optical waveguide for introducing a predetermined rotation of TE and TM modes in the optical channel signal so that polarization components at a second end of the second lithium niobate optical waveguide experience a same amount of phase modulation.

9. The optical modulator of claim 8 wherein the cross splice/delay line means is coupled to the second end of the first lithium niobate optical waveguide and to the first end of the second lithium niobate optical waveguide with first and second polarization maintaining optical fibers, respectively.

10. An optical modulator comprising:

a substrate;

first, second, third, fourth, and fifth electrically conductive electrodes formed substantially parallel to each other on the substrate, the second and fourth electrodes being coupled to a predetermined fixed potential, the first and fifth electrodes being coupled to receive a first electrical driving voltage signal to form a travelling wave therealong, and the third electrode being coupled to receive a second electrical driving voltage signal to form a travelling wave therealong; and the first and second lithium niobate optical waveguides formed on the substrate and oriented substantially parallel to each other, the first lithium niobate optical waveguide being coupled at a first end thereof to receive an optical channel signal from a remote source and is then divided into first and second optical paths which extend between the first and second electrodes and the second and third electrodes, respectively, before being coupled together at a second end thereof, and the second lithium niobate optical waveguide is divided at a first end thereof into first and second optical paths which extend between the third and fourth electrodes and the fourth and fifth electrodes, respectively, before being coupled together at a second end thereof to form an output channel signal from the modulator; and cross splice/delay line means for interconnecting a second end of the first lithium niobate optical waveguide to a first end of the second lithium niobate optical waveguide for introducing a predetermined rotation of TE and TM modes in the optical channel signal so that polarization components at a second end of the second lithium niobate optical waveguide experience a same amount of phase modulation.

11. The optical modulator of claim 10 wherein the cross splice/delay line means is coupled to the second end of the first lithium niobate optical waveguide and to the first end of the second lithium niobate optical waveguide with first and second polarization maintaining optical fibers, respectively.

12. The optical modulator of claim 10 further comprising:

a driving voltage means comprising:
   an amplitude attenuation means for attenuating the amplitude of a recovered clock signal by a predetermined amount and generating an output signal that is responsible for phase modulation in the modulator;
   an adder for adding the output signal from the amplitude attenuation means, and the received recovered clock signal which is responsible for a push-pull amplitude in the modulator, for generating the first electrical driving voltage signal used by the modulator; and
   a subtraction means for subtracting the output signal from the amplitude attenuation means and the received recovered clock signal for generating the second electrical driving voltage signal used by the modulator.

* * * * *